United States Patent
Renth et al.

[11] 3,928,358
[45] Dec. 23, 1975

[54] PIPERAZINE DERIVATIVES

[75] Inventors: Ernst Otto Renth; Kurt Schromm; Anton Mentrup, all of Ingelheim am Rhein; Peter Danneberg, Ockenheim, all of Germany

[73] Assignee: Boehringer Ingelheim GmbH, Ingelheim am Rhein, Germany

[22] Filed: May 15, 1974

[21] Appl. No.: 469,944

[30] Foreign Application Priority Data
May 21, 1973 Germany............................ 2325633

[52] U.S. Cl............................ 260/268 BC; 424/250
[51] Int. Cl.²....................................... C07D 295/12
[58] Field of Search ............... 260/268 BC, 268 PH

[56] References Cited
UNITED STATES PATENTS

| | | | |
|---|---|---|---|
| 3,729,474 | 4/1973 | Mentrup et al. | 260/268 BC |
| 3,810,897 | 5/1974 | Phillipe | 260/268 BC |

Primary Examiner—Donald G. Daus
Assistant Examiner—Jose Tovar
Attorney, Agent, or Firm—Hammond & Littell

[57] ABSTRACT

Compounds of the formula

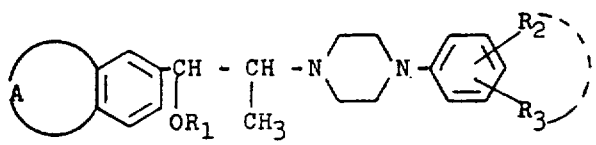

wherein

A is trimethylene, tetramethylene, trimethyleneoxy, methylenedioxy, ethylenedioxy or, together with the adjacent benzene ring, β-naphthyl, $R_1$ is alkyl of one to four carbon atoms, alkanoyl of two to seven carbon atoms, (alkyl of one to four carbon atoms)-carbamoyl or phenyl-carbamoyl, $R_2$ is hydrogen, alkyl of one to four carbon atoms, alkoxy of one to four carbon atoms, halogen or trifluoromethyl, $R_3$ is hydrogen, alkyl of one to four carbon atoms, alkoxy of one to four carbon atoms or halogen, and $R_2$ and $R_3$, together with each other and the carbon atoms of the phenyl ring to which they are attached, form the benzene ring, and non-toxic, pharmacologically acceptable acid addition salts thereof; the compounds as well as the salts are useful as neuroleptics, analgesics, spasmolytics, broncholytics, hypotensives and anti-cholesteremics.

4 Claims, No Drawings

PIPERAZINE DERIVATIVES

This invention relates to novel derivatives of piperazine and non-toxic acid addition salts thereof, as well as to a method of preparing these compounds.

More particularly, the present invention relates to a novel class of piperazine derivatives represented by the formula

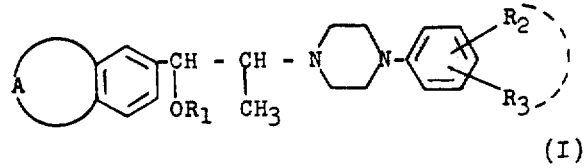

wherein
A is trimethylene, tetramethylene, trimethyleneoxy, methylenedioxy, ethylenedioxy or, together with the adjacent benzene ring, β-naphthyl,
$R_1$ is alkyl of one to four carbon atoms, alkanoyl of two to seven carbon atoms, (alkyl of one to four carbon atoms)-carbamoyl or phenyl-carbamoyl,
$R_2$ is hydrogen, alkyl of one to four carbon atoms, alkoxy of one to four carbon atoms, halogen or trifluoromethyl,
$R_3$ is hydrogen, alkyl of one to four carbon atoms, alkoxy of one to four carbon atoms or halogen, and
$R_2$ and $R_3$, together with each other and the carbon atoms of the phenyl ring to which they are attached, form the benzene ring,
and non-toxic, pharmacologically acceptable acid addition salts thereof.

A sub-genus thereunder is constituted by compounds of the formula I wherein
A is methylenedioxy, ethylenedioxy or trimethyleneoxy,
$R_1$ is alkanoyl of two to seven carbon atoms, (alkyl of one to four carbon atoms)-carbamoyl or phenyl-carbamoyl,
$R_2$ is hydrogen, alkyl of one to four carbon atoms, alkoxy of one to four carbon atoms or halogen,
$R_3$ is hydrogen or methyl, and
$R_2$ and $R_3$, together with each other and the carbon atoms of the phenyl ring to which they are attached, form the benzene ring,
and their non-toxic, pharmacologically acceptable acid addition salts.

Another sub-genus thereunder is constituted by compounds of the formula I wherein
A is methylenedioxy of ethylenedioxy,
$R_1$ is acetyl, propionyl or butyryl,
$R_2$ is hydrogen, methyl or chlorine,
$R_3$ is hydrogen or methyl, and
$R_2$ and $R_3$, together with each other and the carbon atoms of the phenyl ring to which they are attached, form the benzene ring,
and their non-toxic, pharmacologically acceptable acid addition salts.

The compounds embraced by formula I may be prepared by reacting an alcohol of the formula

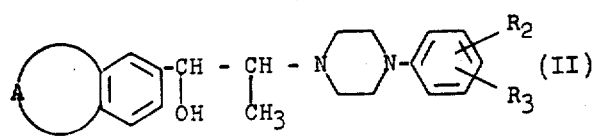

wherein A, $R_2$ and $R_3$ have the same meanings as in formula I, with a compound which is suitable for introduction of the particular $R_1$-substituent which is desired.

For example, if $R_1$ in formula I is to be alkanoyl, the alcohol of the formula II is reacted with the corresponding acid anhydride or alkanoyl halide; if $R_1$ is to be a carbamoyl group, the alcohol is reacted with the corresponding isocyanate; and if $R_1$ is to be alkyl, the alcohol is reacted with the corresponding diazoalkane in the presence of borontrifluoride etherate, or with another alkylating agent, such as the corresponding alkyl halide after conversion of the alcohol into the sodium alcoholate with the aid of sodium hydride or sodium amide.

If the erythro- or threo-form of the alcohol of the formula II is used as the starting compound in the above reactions, the end product of the formula I is also obtained in the erythro- or threo-form, respectively.

In those instances where the above reactions yield a racemic mixture of a compound of the formula I, the same may be separated into its optically active components by conventional methods, such as by forming diastereomers with suitable optically active acids, and separating them by fractional crystallization.

The compounds embraced by formula I are organic bases and therefore form acid addition salts with inorganic or organic acids. Examples of non-toxic, pharmacologically acceptable acid addition salts are those formed with hydrochloric acid, hydrobromic acid, sulfuric acid, phosphoric acid, acetic acid, propionic acid, maleic acid, tartaric acid, citric acid, 8-chlorotheophylline or the like.

The starting compounds of the formula II may be prepared by first reacting a bromo-ketone of the formula

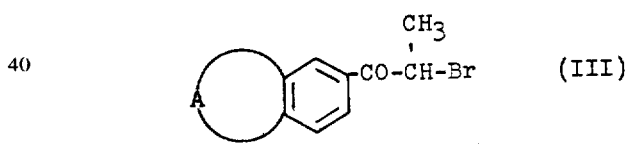

wherein A has the same meanings as in formula I, with a piperazine derivative of the formula

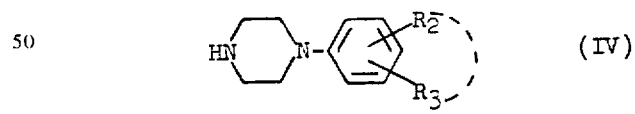

wherein $R_2$ and $R_3$ have the same meanings as in formula I, to form a piperazino-ketone of the formula

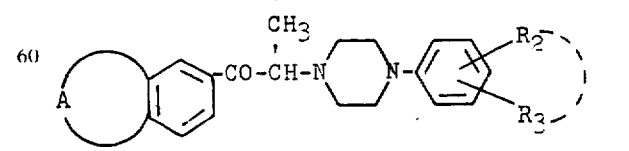

wherein A, $R_2$ and $R_3$ have the meanings previously defined.

An erythro-alcohol of the formula II (Y-form) is obtained by catalytic reduction of a ketone of the formula V in the presence of Raney nickel, platinum or palladium.

A threo-alcohol of the formula II (Z-form) is obtained by reduction of a ketone of the formula V with a complex hydride, such as lithium borohydride, sodium borohydride, potassium borohydride, lithium aluminum hydride or sodium bis-(2-methoxy-ethoxy)-aluminum hydride, or under the conditions of the Meerwein-Ponndorf-Verley reduction.

The following examples further illustrate the present invention and will enable others skilled in the art to understand it more completely. It should be understood, however, that the invention is not limited solely to the particular examples given below.

EXAMPLE 1

Erythro-1-(1',4'-benzodioxan-6'-yl)-2-[N'-(o-tolyl)-piperazino]-propanol-O-acetate hydrochloride

*a.* 6-(2'-Bromo-propionyl)-1,4-benzodioxan 417 gm (2.18 mol) of 6-propionyl-1,4-benzodioxan were dissolved in 1.5 liters of ether, the solution was warmed to 30°C, 112 ml (2.18 mol) of bromine were slowly added to the warm solution, and the resulting mixture was stirred for 30 minutes. Thereafter, the solvent was distilled off in vacuo, the residue was stirred with 1 liter of methanol, the mixture was cooled and vacuum-filtered, and the filter cake was dried. 491 gm (83% of theory) of 6-(2'-bromo-propionyl)-1,4-benzodioxan, m.p. 91°–92°C, were obtained.

*b.* 3',4'-Ethylenedioxy-2-[N'-(o-tolyl)-piperazino]-propiophenone dihydrochloride 90 gm (0.33 mol) of the bromo-ketone obtained in (*a*) were dissolved in 1000 ml of benzene, and then 1.5 ml of isopropylamine and subsequently 116 gm (0.66 mol) of N-(o-tolyl)-piperazine were added to the solution. The resulting mixture was stirred at room temperature for 24 hours, then cooled, and the precipitated N-(o-tolyl)-piperazine hydrobromide was separated by vacuum filtration. The benzene was distilled out of the filtrate in vacuo, the residue was taken up in 200 ml of methanol, and the solution was acidified with ethereal hydrochloric acid. 600 ml of methyl isobutyl ketone were then added, and the mixture was heated at 80°C, while distilling off the major amount of the ether in a descending condenser tube, until a clear solution was formed. The solution was allowed to cool, and the precipitate formed thereby was collected by vacuum filtration and dried, yielding 97 gm (67% of theory) of 3',4'-ethylenedioxy-2-[N'-(o-tolyl)-piperazino]-propiophenone dihydrochloride.

*c.* Erythro-1-(1',4'-benzodioxan-6'-yl)-2-[N'-(o-tolyl)-piperazino]-propanol 22.0 gm (0.05 mol) of 3',4'-ethylenedioxy-2-[N'-(o-tolyl)-piperazino]-propiophenone dihydrochloride were suspended in 200 ml of water, and the suspension was made weakly alkaline by addition of dilute ammonia. The mixture was then extracted with ethyl acetate, the extract was diluted with methanol (1:1), and after addition of Raney nickel the solution was hydrogenated until the calculated amount of hydrogen had been absorbed. Thereafter, the catalyst was vacuum-filtered off, the solvent was distilled out of the filtrate in vacuo, and the residue was recrystallized from ethanol, yielding 9 gm (51% of theory) of erythro-1-(1',4'-benzodioxan-6'-yl)-2-[N'-(o-tolyl)-piperazino]-propanol, m.p. 127°–128°C.

*d.* 7.4 gm (20 millimols) of the end product obtained in (*c*) were admixed with 50 ml of acetic acid anhydride, and the mixture was refluxed for 1 hour, while stirring. Thereafter, the reaction mixture was evaporated to dryness in vacuo, the residue was dissolved in methanol, and the calculated amount of concentrated hydrochloric acid was added to the solution. The mixture was then diluted with water (1:1), stirred for 30 minutes, vacuum-filtered, and the filter cake was recrystallized from ethanol, yielding 75 gm (84% of theory) of the compound of the formula

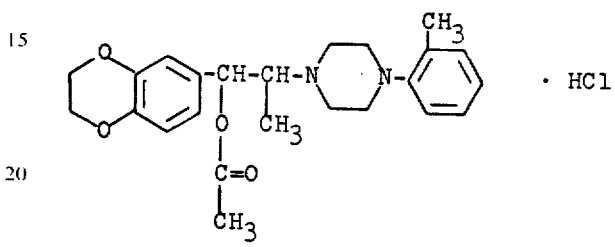

which had a melting point of 232°–235°C.

EXAMPLE 2

Threo-1-(1',4'-benzodioxan-6'-yl)-2-[N'-(o-tolyl)-piperazino]-propanol-O-acetate hydrochloride

*a.* Threo-1-(1',4'-benzodioxan-6'-yl)-2-[N'-(o-tolyl)-piperazino]-propanol 36.6 gm (0.1 mol) of 3',4'-ethylenedioxy-2-[N'-(o-tolyl)-piperazino]-propiophenone, m.p. 116°C (prepared as described in Example 1b), were dissolved in 100 ml of ethanol and, while maintaining the solution at 10°–15°C, 1.9 gm (0.05 mol) of sodium borohydride were added thereto. The resulting mixture was stirred for two hours at room temperature and thereafter poured into water, and the aqueous mixture was extracted with ether. The ethereal extract was evaporated in vacuo, and the residue was recrystallized from methanol, yielding 21 gm (57% of theory) of the above named threoalcohol, m.p. 109°–111°C.

*b.* 18.4 gm (0.05 mol) of the threo-alcohol obtained in (*a*) were admixed with 100 ml of acetic acid anhydride, and the mixture was refluxed for 1 hour. Thereafter, the reaction mixture was evaporated in vacuo, the residue was dissolved in methanol, and the calculated amount of concentrated hydrochloric acid was added to the solution. The mixture was then diluted with water, stirred until crystallization was complete and then vacuum-filtered, and the filter cake was recrystallized from methanol. 15.3 gm (68% of theory) of threo-1-(1',4'-benzodioxan-6'-yl)-2-[N'-(o-tolyl)-piperazino]-propanol-O-acetate hydrochloride, m.p. 218°–220°C, were obtained.

EXAMPLE 3

Erythro-1-(1',4'-benzodioxan-6'-yl)-2-[N'-(o-tolyl)-piperazino]-propanol-O-enanthate hydrochloride 9.2 gm (25 millimols) of erythro-1-(1',4'-benzodioxan-6'-yl)-2-[N'-(o-tolyl)-piperazino]-propanol were dissolved in 50 ml of acetonitrile, 3.7 gm (25 millimols) of enanthic acid chloride were added to the solution, and the mixture was refluxed for 45 minutes. Thereafter, the reaction mixture was cooled, poured into water, and the aqueous mixture was extracted with ethyl acetate. The extract solution was evaporated in vacuo, the residue was dissolved in ethanol, and the solution was made weakly acid with ethereal hydrochloric acid. The acidic mixture was cooled, vacuum-filtered, and the filter cake was recrystallized from isopropanol, yielding 6.0 gm (46.5% of theory) of the hydrochloride named in the heading, which had a melting point of 215°–216°C.

EXAMPLE 4

Erythro-1-(3',4'-methylenedioxy-phenyl)-2-[N'-(o,p-xylyl)-piperazino]-propanol-O-butyrate hydrochloride Erythro-1-(3',4'-methylenedioxy-phenyl)-2-[N'-(o,p-xylyl)-piperazino]-propanol, m.p. 131°–132°C, was prepared, starting from 3,4-methylenedioxy-propiophenone in a manner analogous to that described in Example 1(a)–(c).

2.4 gm (6.5 millimols) of the erythro-alcohol thus obtained were admixed with 30 ml of butyric acid anhydride, and the mixture was stirred for 1 hour at 140°–150°C. Thereafter, the solvent was distilled off in vacuo, the residue was dissolved in ethanol, and the solution was admixed with dilute hydrochloric acid until it was weakly acid. The precipitate formed thereby was collected by vacuum filtration and recrystallized from ethanol, yielding 2.0 gm (65% of theory) of the compound of the formula

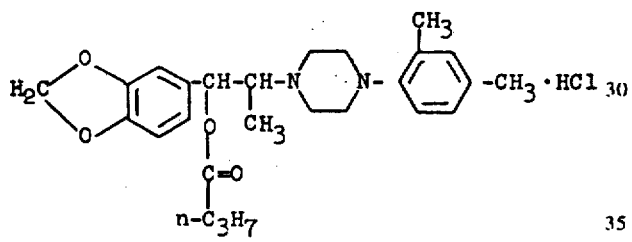

which had a melting point of 227°–228°C.

EXAMPLE 5

Erythro-N-(n-butyl)-1-(1',4'-benzodioxan-6'-yl)-2-[4''-(α-naphthyl)-1'''-piperazino]-propyl-urethane hydrochloride 1.5 gm (0.37 millimols) of erythro-1-(1',4'-benzodioxan-6'-yl)-2-[4''-(α-naphthyl)-1'''-piperazino]-propanol, m.p. 132°–133°C, were dissolved in 30 ml of benzene, and 0.4 gm of n-butyl-isocyanate were added to the solution. The mixture was stirred for 1 hour at 70°C, then cooled, and the solvent was distilled off in vacuo. The residue was dissolved in ethanol, the solution was made weakly acid with 2N hydrochloric acid, and the precipitate formed thereby was collected by vacuum filtration and recrystallized from isopropanol, yielding 1.0 gm (50% of theory) of the compound of the formula

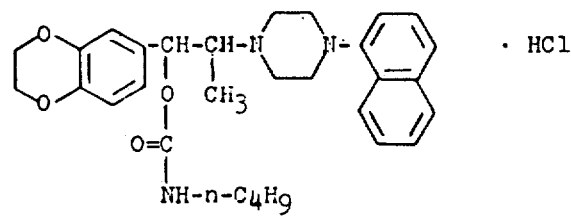

which had a melting point of 187°–188°C.

EXAMPLE 6

Erythro-1-(chroman-6'-yl)-2-[N'-(α-naphthyl)-piperazino]-propyl methyl ether hydrochloride 4.0 gm (10 millimols) of erythro-1-(chroman-6'-yl)-2-[N'-(α-naphthyl)-piperazino]-propanol were dissolved in 100 ml of ether, and, while keeping the temperature of the solution below 20°C, 1.4 gm (10 millimols) of borontrifluoride etherate were added. Subsequently, an ethereal 0.1 N diazomethane solution was slowly added until the mixture remained yellow. The resulting mixture was then allowed to stand overnight, the solvent was distilled off in vacuo, the residue was taken up in methanol, and the solution was weakly acidified with dilute hydrochloric acid. The crystalline substance precipitated thereby was collected by vacuum filtration and recrystallized from methanol in the presence of charcoal, yielding 2.3 gm (55% of theory) of the compound of the formula

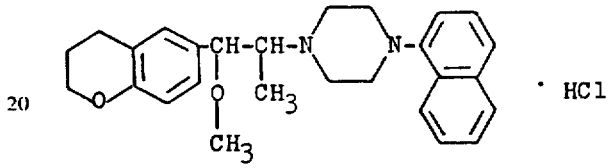

which had a melting point of 213°–215°C.

EXAMPLE 7

Erythro-1-(4',5'-indanyl)-2-[N'-(α-naphthyl)-piperazino]propyl n-butyl ether hydrochloride 7.6 gm (20 millimols) of erythro-1-(4',5'-indanyl)-2-[N'-(α-naphthyl)-piperazino]-propanol, m.p. 142°–144°C, were dissolved in 100 ml of absolute diglyme, and, while stirring, 1.0 gm of 50% sodium hydride was added to the solution, and the mixture was stirred for about 1 hour at 50°C. After the evolution of gas had ceased, the reaction solution was cooled, and then 3.4 gm (25 millimols) of n-butyl bromide were added dropwise. The resulting mixture was refluxed for 2 hours and then slowly poured into 200 ml of ice water. The aqueous mixture was extracted with ethyl acetate, the extract was evaporated to dryness in vacuo, the residue was taken up in methanol, and the solution was acidified with dilute hydrochloric acid. The precipitate formed thereby was collected by vacuum filtration and recrystallized from isopropanol, yielding 3.8 gm (43% of theory) of the compound of the formula

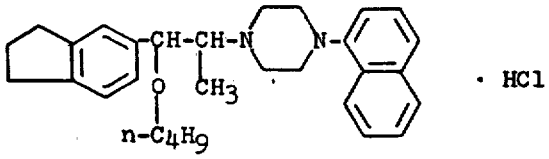

which had a melting point of 268°–269°C.

EXAMPLE 8

Using a procedure analogous to that described in Example 1(d), erythro-1-(chroman-6'-yl)-2-[N'-(α-naphthyl)-piperazino]-propanol-O-acetate hydrochloride, m.p. 224°C, of the formula

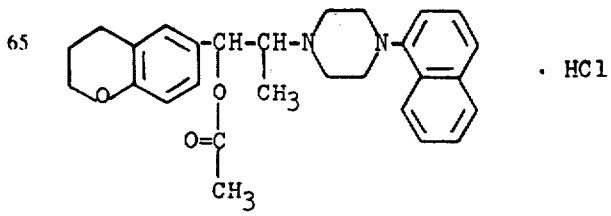

was prepared from erythro-1-(chroman-6'-yl)-2-[N'-(α-naphthyl)-piperazino]-propanol and acetic acid anhydride.

EXAMPLE 9

Using a procedure analogous to that described in Example 1(d), erythro-1-(3',4'-methylenedioxyphenyl)-2-[N'-(α-naphthyl)-piperazino]-propanol-O-acetate hydrochloride, m.p. 242°C, of the formula

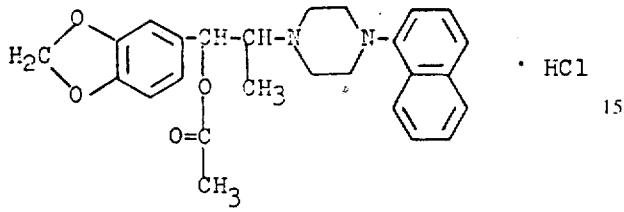

was prepared from erythro-1-(3',4'-methylenedioxyphenyl)-2-[N'-(α-naphthyl)-piperazino]-propanol and acetic acid anhydride.

EXAMPLE 10

Using a procedure analogous to that described in Example 4, erythro-1-(3',4'-methylenedioxy-phenyl)-2-[N'-(o,p-xylyl)-piperazino]-propanol-O-butyrate hydrochloride, m.p. 227°–228°C, of the formula

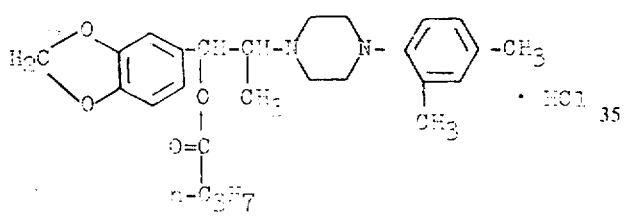

was prepared from erythro-1-(3',4'-methylenedioxyphenyl)-2-[N'-(o,p-xylyl)-piperazino]-propanol and butyric acid anhydride.

EXAMPLE 11

Using a procedure analogous to that described in Example 3, erythro-1-(1',4'-benzodioxan-6'-yl)-2-[N'-(o-tolyl)-piperazino]-propanol-O-pentanoate hydrochloride, m.p. 228°–229°C, of the formula

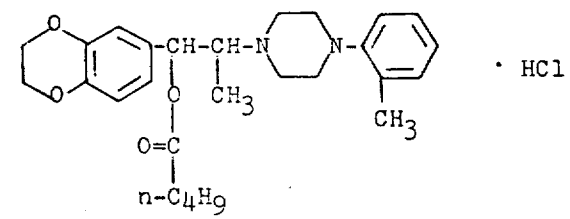

was prepared from erythro-1-(1',4'-benzodioxan-6'-yl)-2-[N'-(o-tolyl)-piperazino]-propanol and pentanoic acid chloride.

EXAMPLE 12

Using a procedure analogous to that described in Example 5, erythro-N-phenyl-1-(1',4'-benzodioxan-6'-yl)-2-[N'-(o-tolyl)-piperazino]-propyl-urethane hydrochloride, m.p. 235°–237°C, of the formula

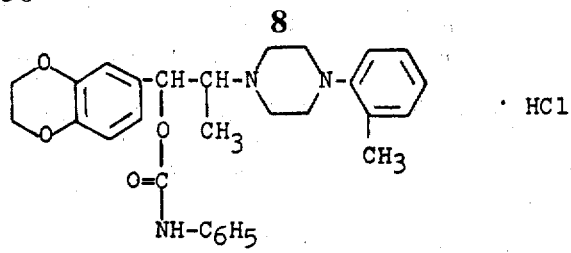

was prepared from erythro-1-(1',4'-benzodioxan-6'-yl)-2-[N'-(o-tolyl)-piperazino]-propanol and phenyl-isocyanate.

EXAMPLE 13

Using a procedure analogous to that described in Example 1(d), erythro-1-(3',4'-methylenedioxyphenyl)-2-[N'-(o-tolyl)-piperazino]-propanol-O-acetate hydrochloride, m.p. 234°–235°C, of the formula

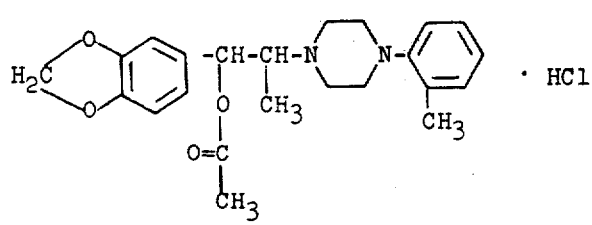

was prepared from erythro-1-(3',4'-methylenedioxyphenyl)-2-[N'-(o-tolyl)-piperazino]-propanol and acetic acid anhydride.

EXAMPLE 14

Using a procedure analogous to that described in Example 5, erythro-N-methyl-1-(β-naphthyl)-2-[N'-phenyl-piperazino]-propyl-urethane hydrochloride, m.p. 181°–182'C, of the formula

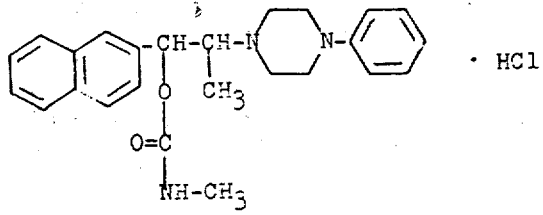

was prepared from erythro-1-(β-naphthyl)-2-[N'-phenyl-piperazino]-propanol and methyl-isocyanate.

EXAMPLE 15

Using a procedure analogous to that described in Example 1(d), erythro-1-(3',4'-methylenedioxyphenyl)-2-[N'-(o-chloro-phenyl)-piperazino]-propanol-O-acetate hydrochloride, m.p. 219°–221°C, of the formula

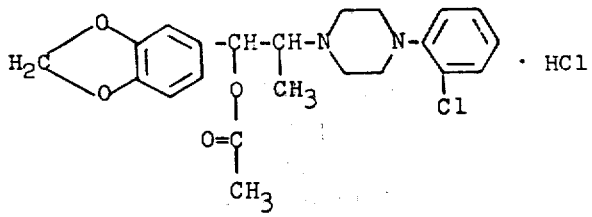

was prepared from erythro-1-(3',4'-methylenedioxy-phenyl)-2-[N'-(o-chloro-phenyl)-piperazino]-propanol and acetic acid anhydride.

EXAMPLE 16

Using a procedure analogous to that described in Example 3, erythro-1-(1',4'-benzodioxan-6'-yl)-2-[N'-(m-trifluoromethyl-phenyl)-piperazino]-propanol-O-propionate hydrochloride, m.p. 202°–205°C, of the formula

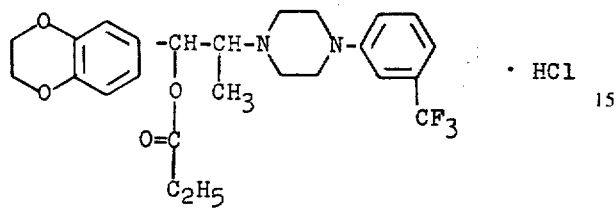

was prepared from erythro-1-(1',4'-benzodioxan-6'-yl)-2-[N'-(m-trifluoromethyl-phenyl-piperazino]-propanol and propionic acid chloride.

The compounds of the present invention, that is, those embraced by formula I and their non-toxic acid addition salts, have useful pharmacodynamic properties. More particularly, the compounds of this invention exhibit primarily neuroleptic activities and in addition also analgesic, spasmolytic, broncholytic, hypotensive and anti-cholesteremic activities in warm-blooded animals, such as mice and rats.

For pharmaceutical purposes the compounds according to the present invention are administered to warm-blooded animals perorally, parenterally or rectally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0016 to 1.67 mgm/kg body weight, preferably 0.083 to 0.84 mgm/kg body weight.

The following examples illustrate a few pharmaceutical dosage unit compositions comprising a compound of the present invention as an active ingredient and represent the best mode contemplated of putting the invention into practical use. The parts are parts by weight unless otherwise specified.

EXAMPLE 17

Tablets

The tablet composition is compounded from the following ingredients:

| | |
|---|---|
| Erythro-1-(1',4'-benzodioxan-6'-yl)-2-[N'-(o-tolyl)-piperazino]-propanol-O-acetate hydrochloride | 30 parts |
| Lactose | 70 parts |
| Corn starch | 93 parts |
| Sec. calcium phosphate | 47 parts |
| Soluble starch | 3 parts |
| Magnesium stearate | 3 parts |
| Colloidal silicic acid | 4 parts |
| Total | 250 parts |

Preparation:

The piperazine derivative is intimately admixed with a major portion of the inert excipients, the mixture is uniformly moistened with an aqueous solution of the soluble starch, and the moist mass is granulated through a fine-mesh screen. The granulate is dried and admixed with the remainder of the excipients, and the composition is compressed into 250 mgm-tablets in a conventional tablet making machine. Each tablet contains 30 mgm of the piperazine derivative and is an oral dosage unit composition with effective neuroleptic action.

EXAMPLE 18

Coated pills

The pill core composition is compounded from the following ingredients:

| | |
|---|---|
| Erythro-1-(1',4'-benzodioxan-6'-yl)-2-[N'-(o-tolyl)-piperazino]-propanol-O-acetate hydrochloride | 50 parts |
| Lactose | 50 parts |
| Corn starch | 70 parts |
| Sec. calcium phosphate | 50 parts |
| Magnesium stearate | 3 parts |
| Soluble starch | 3 parts |
| Colloidal silicic acid | 4 parts |
| Total | 250 parts |

Preparation:

The ingredients are compounded in the same manner as in the preceding example, and the composition is compressed into 250 mgm-pill cores which are subsequently coated with a thin shell consisting essentially of a mixture of talcum, sugar and gum arabic, and finally polished with beeswax. Each coated pill contains 50 mgm of the piperazine derivative and is an oral dosage unit composition with effective neuroleptic action.

EXAMPLE 19

Tablets with additional spasmolytic ingredient:

The tablet composition is compounded from the following ingredients:

| | |
|---|---|
| Erythro-1-(1',4'-benzodioxan-6'-yl)-2-[N'-(o-tolyl)-piperazino]-propanol-O-acetate hydrochloride | 5 parts |
| (-)-N-Scopolammonium butyl bromide | 25 parts |
| Lactose | 179 parts |
| Corn starch | 209 parts |
| Colloidal silicic acid | 14 parts |
| Polyvinylpyrrolidone | 6 parts |
| Magnesium stearate | 2 parts |
| Soluble starch | 10 parts |
| Total | 450 parts |

Preparation:

The ingredients are compounded in a manner analogous to that described in Example 17, and the composition is compressed into 450 mgm-tablets. Each tablet contains 5 mgm of the piperazine derivative and 25 mgm of the scopolammonium compound and is an oral dosage unit composition with effective neuroleptic and spasmolytic actions.

EXAMPLE 20

Suppositories with additional analgesic ingredient:

The suppository composition is compounded from the following ingredients:

| | |
|---|---|
| Erythro-1-(1',4'-benzodioxan-6'-yl)-2-[N'-(o-tolyl)-piperazino]-propanol-O-acetate hydrochloride | 30 parts |
| Metamizol | 10 parts |
| Lecithin | 2 parts |
| Suppository base (e.g. cocoa butter) | 1790 parts |
| Total | 1832 parts |

Preparation:

The suppository base is melted, the other ingredients are homogeneously admixed therewith, and 1832 mgm-portions of the mixture are poured into cooled suppository molds and allowed to harden therein. Each suppository contains 30 mgm of the piperazine derivative and 10 mgm of metamizol, and is a rectal dosage unit composition with effective neuroleptic, analgesic and antipyretic actions.

Analogous results are obtained when any one of the other piperazine derivatives embraced by formula I or a nontoxic, pharmacologically acceptable acid addition salt thereof is substituted for the particular piperazine derivative in Examples 17 through 20. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the air of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

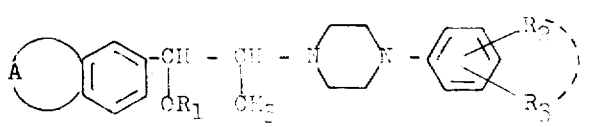

wherein
A is methylenedioxy or ethylenedioxy,
$R_1$ is (alkyl of one to four carbon atoms)-carbamoyl or phenyl-carbamoyl,
$R_2$ is hydrogen, alkyl of one to four carbon atoms, alkoxy of one to four carbon atoms, halogen or trifluoromethyl,
$R_3$ is hydrogen, alkyl of one to four carbon atoms, alkoxy of one to four carbon atoms or halogen, and
$R_2$ and $R_3$, together with each other and the carbon atoms of the phenyl ring to which they are attached, form the benzene ring,
or a non-toxic, pharmacologically acceptable acid addition salt thereof.

2. A compound of claim 1, wherein
A is methylenedioxy or ethylenedioxy,
$R_1$ is (alkyl of one to four carbon atoms)-carbamoyl or phenylcarbamoyl,
$R_2$ is hydrogen, alkyl of one to four carbon atoms, alkoxy of one to four carbon atoms or halogen,
$R_3$ is hydrogen or methyl, and
$R_2$ and $R_3$, together with each other and the carbon atoms of the phenyl ring to which they are attached, form the benzene ring,
or a non-toxic, pharmacologically acceptable acid addition salt thereof.

3. A compound of claim 1, which is erythro-N-(n-butyl)-1-(1',4'-benzodioxan-6'-yl)-2-[4''-(α-napthyl)-1''-piperazino]-propyl-urethane or a non-toxic, pharmacologically acceptable acid addition salt thereof.

4. A compound of claim 1, which is erythro-N-phenyl-1-(1',4'-benzodioxan-6'-yl)-2-[N'-(o-tolyl)-piperazino]-propyl-urethane or a non-toxic, pharmacologically acceptable acid addition salt thereof.

* * * * *